US012708802B2

(12) United States Patent
Muir et al.

(10) Patent No.: US 12,708,802 B2
(45) Date of Patent: Aug. 18, 2026

(54) CONNECTOR SYSTEMS FOR BREATHING APPARATUS

(71) Applicant: DRAEGER SAFETY UK LIMITED, Blythe (GB)

(72) Inventors: Derek Muir, Durham (GB); Amr Elsaadani, Gateshead (GB)

(73) Assignee: DRAEGER SAFETY UK LIMITED, Blyth (GB)

( * ) Notice: Subject to any disclaimer, the term of this patent is extended or adjusted under 35 U.S.C. 154(b) by 692 days.

(21) Appl. No.: 18/017,475

(22) PCT Filed: Aug. 12, 2021

(86) PCT No.: PCT/EP2021/072534
§ 371 (c)(1),
(2) Date: Jan. 23, 2023

(87) PCT Pub. No.: WO2022/034188
PCT Pub. Date: Feb. 17, 2022

(65) Prior Publication Data
US 2023/0271034 A1 Aug. 31, 2023

(30) Foreign Application Priority Data
Aug. 12, 2020 (GB) ..................................... 2012558

(51) Int. Cl.
*A62B 9/04* (2006.01)
*H01R 13/62* (2006.01)
*H01R 13/642* (2006.01)

(52) U.S. Cl.
CPC ........... *A62B 9/04* (2013.01); *H01R 13/6205* (2013.01); *H01R 13/642* (2013.01)

(58) Field of Classification Search
CPC ................................. A62B 9/04; A62B 25/00
See application file for complete search history.

(56) References Cited

U.S. PATENT DOCUMENTS 4,025,964 A 5/1977 Owens
4,874,316 A * 10/1989 Kamon .............. H01R 13/6205 439/39
9,017,092 B1 4/2015 Mccracken et al.
9,548,559 B2 * 1/2017 Zhou .................. H01R 13/6205
(Continued)

FOREIGN PATENT DOCUMENTS

CN 103187657 A 7/2013
CN 206483003 U 9/2017
(Continued)

OTHER PUBLICATIONS

Jun. 11, 2025—(EP) Examination Report—Appl No. 23212079.0.
(Continued)

*Primary Examiner* — Bradley H Philips
(74) *Attorney, Agent, or Firm* — Banner & Witcoff, Ltd.

(57) ABSTRACT

Disclosed are connector systems for power and/or data transfer in breathing apparatus. The connector systems may comprise magnetically attractive elements and magnets. The connector systems may comprise protrusions and complimentary recesses which are aligned perpendicularly to a cable axis of the connector or connectors. Also disclosed are breathing apparatus comprising the connector systems, and breathing apparatus charging systems.

17 Claims, 8 Drawing Sheets

(56) References Cited

U.S. PATENT DOCUMENTS

| | | | | |
|---|---|---|---|---|
| 10,658,789 | B1 | 5/2020 | Wang et al. | |
| 2007/0235030 | A1* | 10/2007 | Teetzel | A62B 9/04 128/205.12 |
| 2008/0257928 | A1* | 10/2008 | Lowry | A45F 3/10 224/638 |
| 2009/0054208 | A1 | 2/2009 | Wu | |
| 2012/0148195 | A1 | 6/2012 | Umeno | |
| 2012/0178270 | A1* | 7/2012 | McElroy | H01R 13/6205 439/39 |
| 2013/0171840 | A1* | 7/2013 | Mysliwiec | H01R 13/6205 439/40 |
| 2015/0325953 | A1* | 11/2015 | McCracken | H01R 13/6315 439/108 |
| 2015/0349457 | A1* | 12/2015 | Shariff | H01R 24/20 439/39 |
| 2017/0359101 | A1 | 12/2017 | Sabacinski | |
| 2018/0040975 | A1* | 2/2018 | Davies | H01R 13/629 |
| 2019/0089087 | A1* | 3/2019 | Asai | H01R 13/2471 |
| 2019/0312380 | A1 | 10/2019 | Finona et al. | |

FOREIGN PATENT DOCUMENTS

| | | | |
|---|---|---|---|
| GB | 2556204 | A | 5/2018 |
| WO | 2004095647 | A1 | 11/2004 |
| WO | 2019071296 | A1 | 4/2019 |
| WO | 2020049136 | A1 | 3/2020 |

OTHER PUBLICATIONS

International Search Report and Written Opinion, dated Feb. 28, 2022, issued in priority International Application No. PCT/EP2021/072534.

UK Combined Search and Exam Report, dated Jan. 27, 2021, issued in priority GB Application No. GB2012558.9.

UK Search Report, dated May 13, 2021, issued in priority GB Application No. GB2012558.9.

* cited by examiner

CONNECTOR SYSTEMS FOR BREATHING APPARATUS

CROSS-REFERENCE TO RELATED APPLICATIONS

This application claims the priority of International PCT Application No. PCT/EP2021/072534, filed on Aug. 12, 2021,which claims priority to GB Application No. GB2012558.9, filed on Aug. 12, 2020, the entire contents of which being fully incorporated herein by reference.

The present disclosure relates to data and/or power connectors for breathing apparatus and is particularly, although not exclusively, concerned with a connector apparatus for a wearable support frame for a breathing apparatus.

BACKGROUND OF THE INVENTION

Breathing apparatus, such as self-contained breathing apparatus, generally comprise a wearable support frame, or backplate, which supports a container of breathing gas, and which is worn on a user's back with shoulder straps and a waist belt. Modern breathing apparatuses may have on-board electronics such as communication devices, telemetry, lights, cameras, sensors, amongst other electronic systems. These electronic systems may be powered by an on-board battery provided, for example, on the backplate, and data transfer to and from the electronics may be required. Therefore, a connector system for data and/or power transfer with the breathing apparatus may be required.

It is important that the charging and data transfer connector system is robustly but easily connectable to the backplate. Further, it is important that the connector system is suitable for use in the hazardous environments in which the breathing apparatus will operate. Many connectors which are used in non-safety-critical applications, such as consumer electronics, are simply not reliable and robust enough to deal with the hazards and demands which will be placed on an emergency services breathing apparatus.

Therefore, it will be understood that improvements in connector systems for data and power transfer in the specific field of breathing apparatus may be desirable.

STATEMENTS OF INVENTION

According to an aspect of the present disclosure, there is provided a connector system for a wearable support frame of a breathing apparatus in accordance with the appended independent claim 1. The connector system comprises a first connector provided on a wearable support frame and a second connector for connection to the first connector. The first connector comprises an electrical transfer element and a magnetically attractive element to be attracted by a magnet. The second connector comprises a complementary electrical transfer element for power and/or data transfer with the electrical transfer element of the first connector and further comprises a magnet for attracting the magnetically attractive element so as to magnetically secure the first and second connector to one another for power and/or data transfer between the electrical transfer elements.

The first connector may comprise a plurality of magnetically attractive elements and the second connector may comprise a respective plurality of magnets for attracting the plurality of magnetically attractive elements.

At least two of the magnetically attractive elements may be arranged on opposing sides of the electrical transfer element, and at least two of the magnets may be arranged on opposing sides of the complementary electrical transfer element.

The magnetically attractive element may be covered by a non-conducting material such that the magnetically attractive element is not exposed on the surface of the first connector. The non-conducting material may be a potting resin.

The electrical transfer element and the complementary electrical transfer element may be conductive electrical contacts or may be inductive electrical elements.

The magnet may be a permanent magnet or an electromagnet.

The first connector may further comprise a protrusion or a recess having the electrical transfer element, and the second connector may further comprise a complementary recess or protrusion having the complementary electrical transfer element.

The connector system may comprise a plurality of electrical transfer elements and a respective plurality of complimentary electrical transfer elements. At least one pair of an electrical transfer element and a complimentary electrical transfer element may be configured to transfer power, and at least one pair of an electrical transfer element and a complimentary electrical transfer element may be configured to transfer data.

The second connector may comprise a cover configured to overlay the magnets so as to prevent inadvertent attachment of ferrous metal articles to the second connector when the second connector is not in use. The cover may be movable, such as by a hinge, into and out of a covered position (i.e. between covered and uncovered positions). The cover may be made of an elastomeric material. The cover may comprise ferrous metallic magnetic elements configured to be attracted to the magnets.

According to a second aspect, there is provided a connector system for power and/or data transfer in accordance with the appended independent claim 13. The connector system comprises a first connector comprising a contact protrusion having at least first and second electrical contacts. The electrical contacts define a contact axis along a straight line extending between the first and second contacts. The connector system further comprises a second connector comprising a complementary recess for receiving the contact protrusion having complementary electrical contacts for contacting the first and second electrical contacts of the first connector. At least one of the first and second connectors is attached to a cable and, at a connection interface between the cable and the connector, a longitudinal axis of the cable is substantially perpendicular to the contact axis.

The contact protrusion and the complementary recess may each comprise a peripheral surface which is inclined with respect to the longitudinal axis of the cable. The inclined peripheral surfaces may be configured to overlay one another when the first and second connectors are in a connected configuration.

The inclined peripheral surfaces may be inclined with respect to the longitudinal axis of the cable such that, in the connected configuration, a tensile force applied to the cable will urge the first and second connectors to disconnect as the inclined peripheral surfaces move relative to one another.

The contact protrusion and/or the complimentary recess may have a longest dimension, in particular in plan view, which extends substantially perpendicular to the longitudinal axis of the cable. The longest dimension of the protrusion and/or recess may be substantially coextensive or parallel with the contact axis.

The inclined peripheral surfaces may be arranged on an opposing peripheral side of the contact protrusion and/or complimentary recess to the connection interface between the cable and the connector. A peripheral wall of the protrusion or recess may face the cable, and the inclined peripheral surface may be arranged on the other side of the protrusion or recess, facing away from the cable.

The first and/or second connector may comprise a connector portion on which the contact protrusion or complimentary is arranged. The connector portion may be substantially planar or flat. The connector may further comprise a stepped portion comprising the connection interface between the cable and the connector such that the longitudinal axis of the cable is spaced apart from the connector portion. In other words, the cable may intersect with the connector such that it is spaced away from the other connector to a greater degree than the connector portion.

The first and second connectors each comprise three or more electrical contacts arranged on the contact axis. All of the electrical contacts of the connectors may be arranged on the respective contact axis.

The contact protrusion and the complementary recess may each further comprise one or more further peripheral inclined surfaces, which may be parallel to the longitudinal axis of the cable, such that, in the connected configuration, a lateral force applied to the connector which is not aligned with the longitudinal axis of the cable will urge the first and second connectors to disconnect as the further inclined peripheral surfaces move relative to one another.

At least one pair of an electrical contact and a complimentary electrical contact may be configured to transfer power, and at least one pair of an electrical contact and a complimentary electrical contact may be configured to transfer data.

In a third aspect, there is provided a connector arrangement for a wearable support frame of a breathing apparatus, comprising: a first connector, comprising a contact protrusion having at least one electrical contact; a second connector, comprising a complementary contact recess having a complementary electrical contact; wherein the electrical contact and the complementary electrical contact are connectable to provide power and/or data transfer; wherein one of the first and second connectors comprises: a locating protrusion adjacent the contact recess or contact protrusion, the locating protrusion extending outwardly of the first connector; and the other of the first and second connectors comprises: a complementary locating recess within with the location protrusion can be located in a connected configuration of the first and second connectors; the locating protrusion and the locating recess arranged such that the connection of the electrical contacts is only possible in a single relative orientation of the first and second connectors; wherein the contact protrusion, the complementary contact recess, the locating protrusion and the locating recess each comprise a surface angled such that application of a force in a direction transverse to the direction of extension of the protrusions acts to separate each protrusion and the complementary recess, and therefore the first and second connectors.

In the first, second, and third aspects, the connector which is arranged on the wearable support frame may be arranged on a rear surface of the wearable support frame which is configured to face the user's back in use. The connector may be arranged on a front surface of the wearable support frame which faces away from the user's back in use.

According to a fourth aspect, there is provided a wearable support frame for a breathing apparatus comprising a connector system according to one or more of the first, second, and third aspects.

According to a fifth aspect, there is provided a breathing apparatus comprising a wearable support frame according to the fourth aspect.

According to a sixth aspect, there is provided a breathing apparatus charging system comprising a breathing apparatus according to the fifth aspect, and a charging apparatus comprising the second connector. The charging apparatus is configured to charge the breathing apparatus via the first and second connectors.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

In particular, one, two, or all three of the first, second, and third aspects may be embodied in the same connector apparatus.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
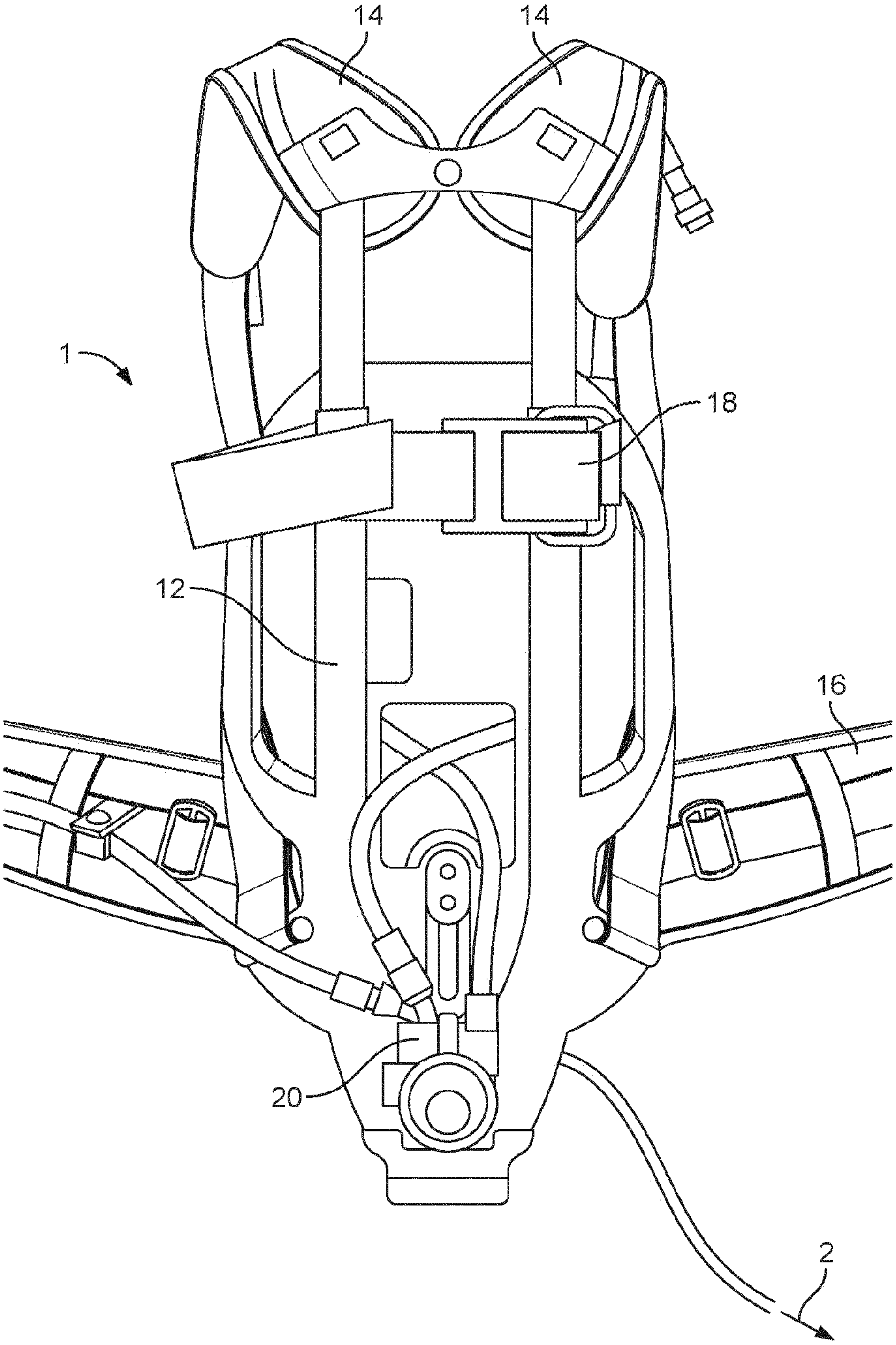
FIG. 1 is a front plan view of a breathing apparatus connector system.

FIG. 1 shows a breathing apparatus connector system and, in particular, a breathing apparatus charging system. Although the system shown is a charging system, it is also capable of transferring data to and from the breathing apparatus. It should be understood that the connector system can be used to transfer power, data, or both. The data to be transferred may comprise usage data, telemetry data, battery health data, or other types of data relevant to breathing apparatus.

The breathing apparatus charging system comprises a breathing apparatus 1 and a charging apparatus 2 (not shown). The breathing apparatus 1 (as shown in FIG. 1 which is a plan view of a front face of the breathing apparatus 1), comprises a wearable support frame 12, in particular a backplate 12, which is configured to be supported on a user's back with shoulder straps 14 and a waist belt 16. The backplate 12 is configured to support a breathing gas cylinder (not shown) which is fixed to the backplate using a support strap 18 and a pressure reduction valve 20.

Figure 2:
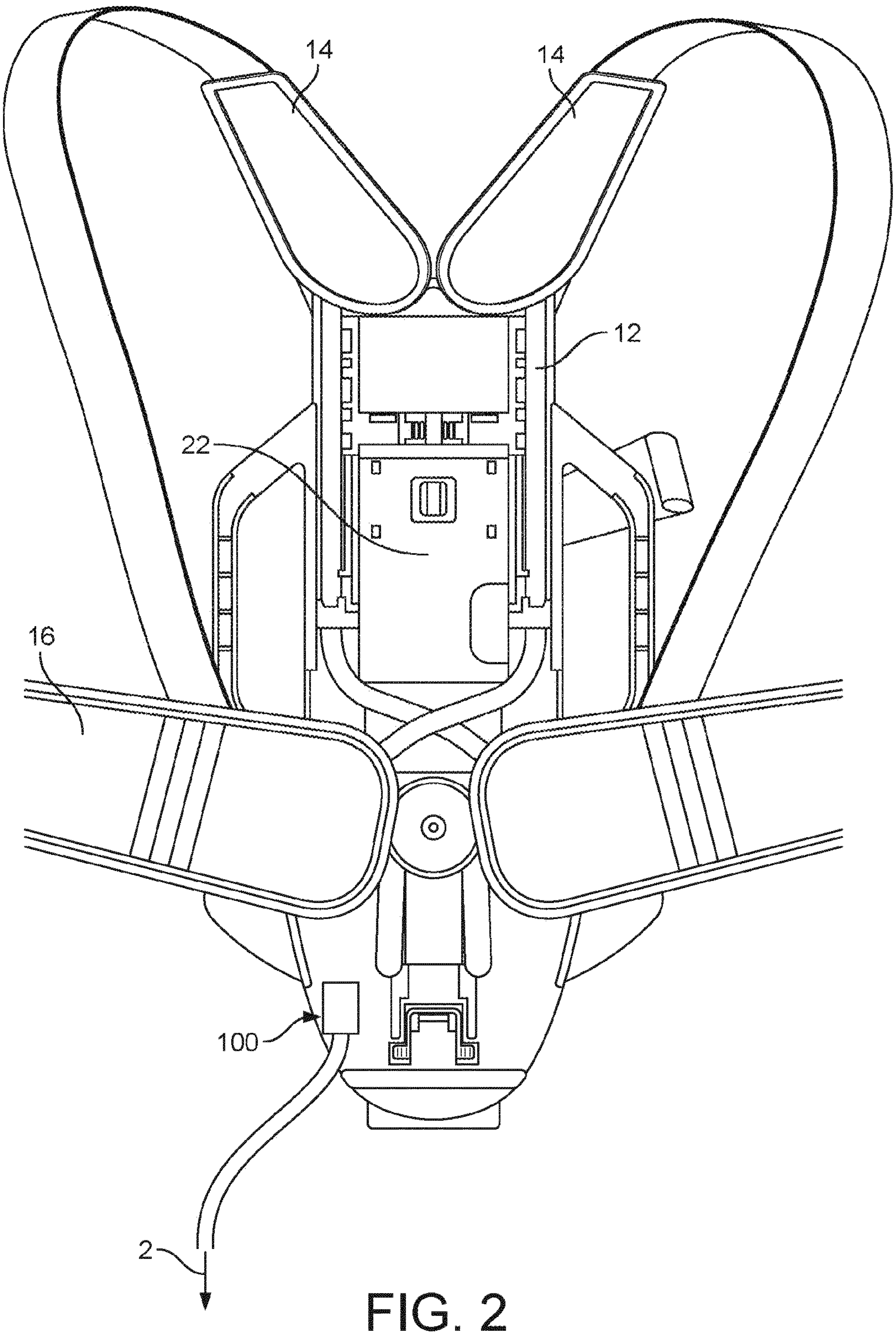
FIG. 2 is a rear plan view of a breathing apparatus connector system.

FIG. 2 shows a plan view of a rear face of the breathing apparatus 1 and the charging apparatus 2. This face of the backplate 12 is arranged against the user's back in use. The backplate 12 further comprises an electronics module 22 arranged centrally on the backplate 12. The electronics module 22 comprises at least one battery and various controllers for transmitting and receiving data.

In FIG. 2, a connector system 100 can be seen. In this example, the connector system is arranged on the user-facing or rear side of the backplate 12, but in other examples it may be arranged on the front side, or some other location on the backplate. By providing part or all of the connector system on the rear of backplate 12, it may be more protected from hazardous operating environments in use.

The connector system 100 is shown in more detail in FIGS. 3, 4, 5, and 6, which should be referred to alongside the following description.

Figure 3:
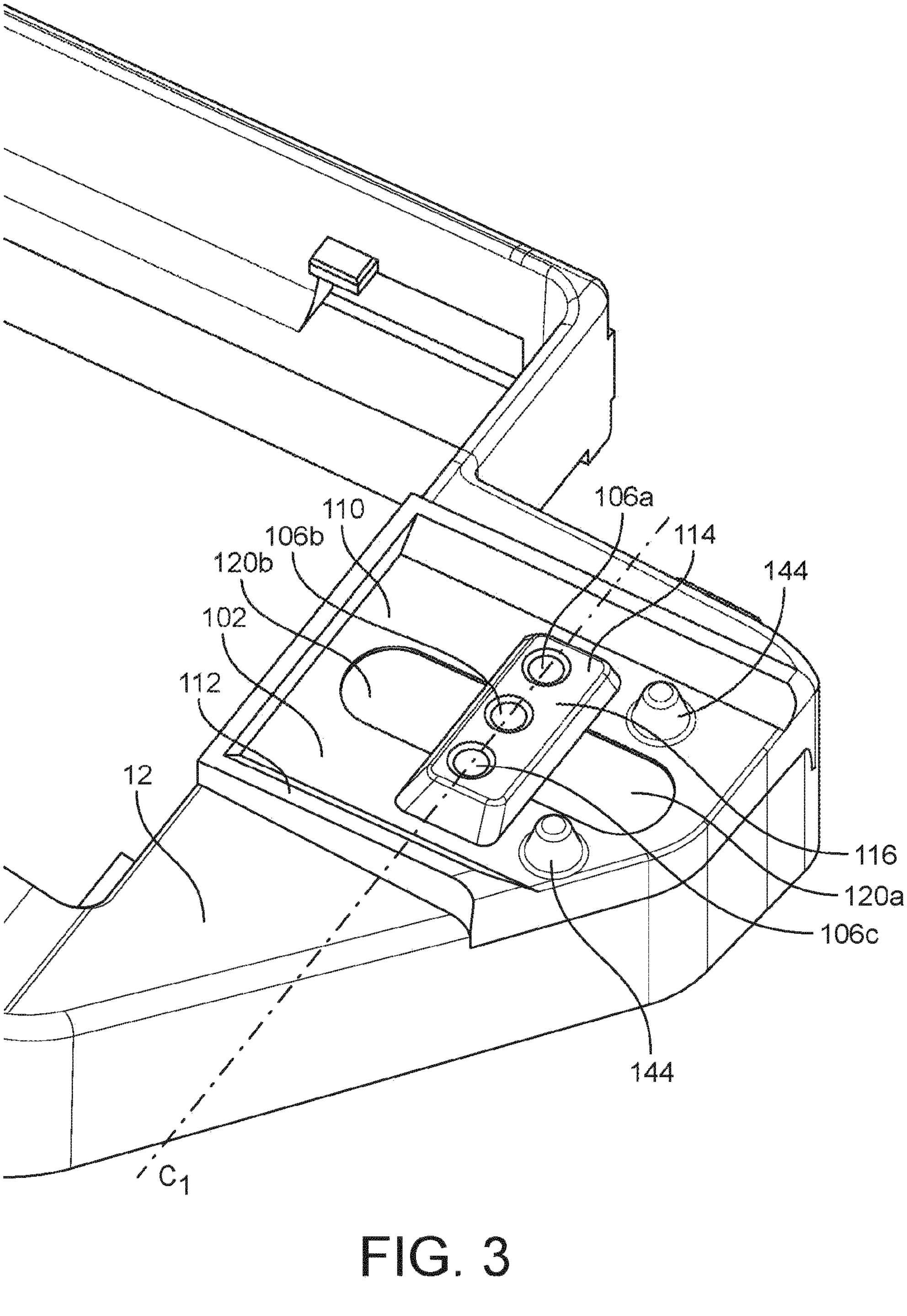
FIG. 3 is a perspective view of a connector for a breathing apparatus connector system.
Figure 4:
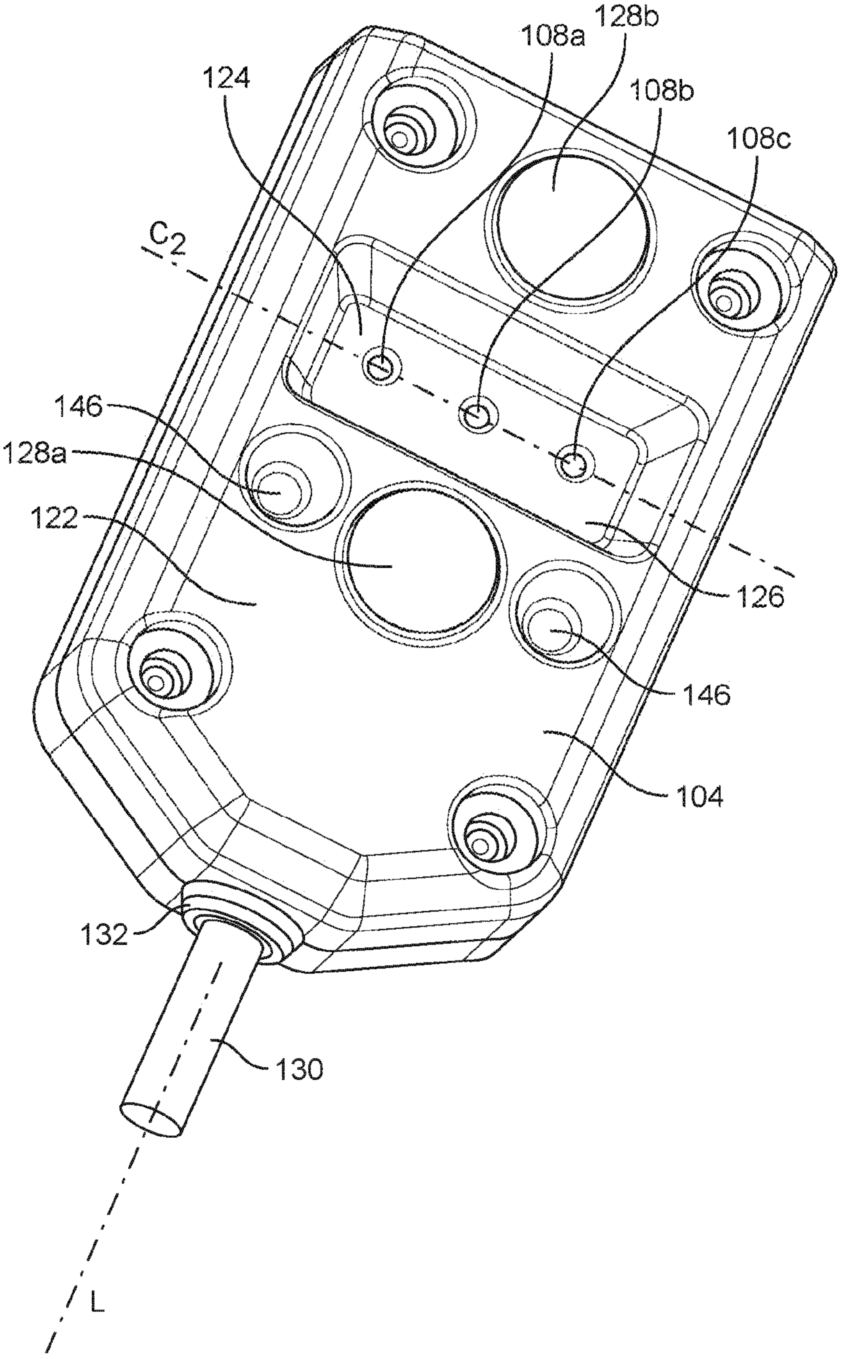
FIG. 4 is a perspective view of a further connector for a breathing apparatus connector system.

FIG. 3 shows a detailed perspective view of a first connector 102 of the connector system 100. The first connector 102 is arranged on the backplate 12. The connector system 100 further comprises a second connector 104 for connection to the first connector 102, as shown in FIG. 4. The first and second connectors 102,104 are configured to be connected to provide power and data transfer between the breathing apparatus, in particular to charge the battery of the electronics module 22 and to send and receive data from the controllers of the electronics module 22.

The first connector 102 comprises at least one electrical transfer element, in this case three electrical contacts 106. In other examples, inductive transfer elements, or other wireless transfer elements may be provided. The second connector comprises at least one electrical transfer element (corresponding to the electrical transfer element or elements), in this case three complimentary electrical contacts 108, which are configured to contact the electrical contacts 106 of the first connector to thereby transfer electrical signals. The contacts on each connector are arranged in a line, with two outer contacts and a central contact. One of the outer pairs of contacts 106*a*,108*a* are configured to transfer data to and from the electronics module 22, the other outer pair of contacts 106*c*,108*c* are configured to transfer power to charge the battery of the electronics module 22, and the central, third pair of contacts 106*b*,108*b* are configured to provide a ground.

The first connector 102 comprises a flat, generally rectangular surface 110, which is bordered by a peripheral rim 112. A protrusion 114 is provided which protrudes from the surface 110. The protrusion 114 has a flat raised surface 116 on which the electrical contacts 106 are arranged. The raised surface 116 is generally rectangular and is bordered by upwardly-extending peripheral walls 136, 140, 142

Figure 5:
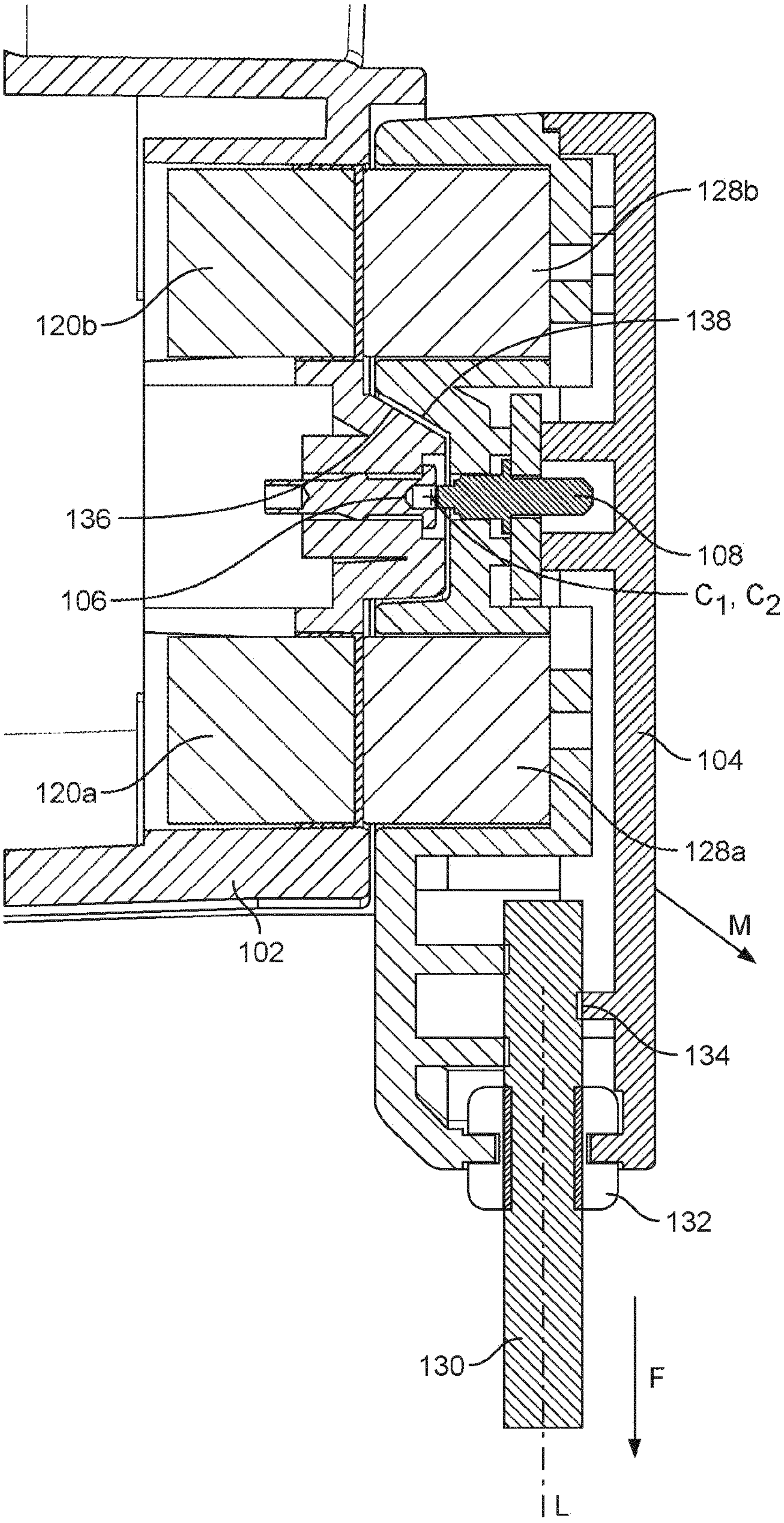
FIG. 5 is a cross-sectional view of the connectors of FIGS. 3 and 4 in a connected configuration.

With reference to FIG. 5, the first connector 102 comprises first and second magnetically attractive elements 120*a,b*, which are capable of being attracted by a magnet. The magnetically attractive elements 120*a,b* are ferromagnetic elements which themselves do not produce a magnetic field, but which can be attracted to a magnet, such as a permanent magnet or an electromagnet. It is important that the magnetically attractive elements 120*a,b* are not permanently magnetised, as will be explained below. In this example, the magnetically attractive elements 120*a,b* are masses of ferromagnetic material, such as steel. The elements 120*a,b* are sealed under a layer of non-conductive material, such as an encapsulating, or potting resin, preventing their exposure on the surface 110.

Turning now to the second connector 104 shown in FIG. 4, the second connector 104 is generally rectangular in shape and comprises a generally rectangular surface 122 which is complimentarily shaped to the rectangular surface 110 of the first connector 102. The second connector 104 comprises a recess 124 on the surface 122, which is complimentarily shaped and located such that, when the second connector is arranged to overlay the first connector, the protrusion 114 is received in the recess 124, while the second connector 104 is closely bordered by the rim 112 of the first connector. The recess 124 has a recessed flat surface 126 on which the complimentary contacts 108 are arranged so as to contact the contacts 106 when the connectors 102,104 are connected and the protrusion 114 is received in the recess 124. The complimentary contacts 108 are spring-loaded such that, when the protrusion 114 is correctly received in the recess 124, the complimentary contacts 108 are forced to retract slightly into the surface 126 by the contacts 106.

The second connector 104 comprises first and second magnets 128*a,b* for attracting the magnetically attractive elements 120*a,b* of the first connector 102. In this case, the magnets 128*a,b* are permanent magnets, but they could be alternatively electromagnets or the like. The magnets 128*a, b*, produce their own magnetic field so as to attract the magnetically attractive elements 120*a,b* respectively when the connectors 102 ,104 are connected together. The magnetically attractive elements 120 and the magnets 128 are positioned on the respective connectors 102,104 such that they substantially overlay one another when the connectors 102, 104 are connected. Therefore, the magnets 128, by magnetically attracting the elements 120 magnetically secure the first and second connector to one another, with their contacts 106,108 in contact so that power and/or data transfer can occur. The connectors 102,104 are shown in their connected configuration in FIG. 5, where it can be seen that the magnets 128 overlay and attract the magnetically attractive elements 120, and the contacts 106,108 are maintained in contact to allow power and data transfer.

In this example, the two magnetically attractive elements 120 are arranged on opposing sides of the contacts 106 (and the protrusion 114, and the two magnets 128 are similarly arranged on opposing sides of the complementary contacts 108 (and the recess 124). This may serve to provide a stronger connection between the connectors 102,104 by providing a retaining force on opposing sides of the contacts.

Providing a non-magnetised element on the backplate may be advantageous in the particular field of breathing apparatus. A magnetised element on the backplate (i.e. a magnet which produces its own magnetic field) could attract debris and other items in a hazardous environment to the backplate, which could cause a dangerous snagging hazard for the user. Therefore, by providing the magnetised part of the connector retaining system on the second connector which is not part of the backplate, an increased risk of snagging may be avoided. Further, by covering the magnetically attractive elements with non-conductive material to prevent their exposure on the outer surface of the connector on the backplate, a sparking hazard may be reduced (which is important in hazardous atmosphere including flammable gases), as the metallic material of the elements could provide a sparking location if left exposed.

In use by a firefighter, a backplate is subject to temperatures in the region of 250° C. Magnets which are heated above their maximum operating temperature may degrade and lose performance over time, even after cooling. By providing the permanent magnet on the second connector, which is not part of the backplate, the magnets will not be exposed to high ambient temperatures and the maximum operating temperature of the magnetic material can be eliminated from the material selection constraints. This may enable the use of a wider range of magnetic materials and reduce/avoid the need for replacement of the magnets during the life of the product.

Another aspect of the connector system 100 is discussed below, again with reference to FIGS. 3-6.

The electrical contacts 106 of the first connector 102 define a contact axis C1 along a straight line extending between the contacts 106. Likewise, the complimentary contacts 108 of the second connector 104 define a contact axis C2. When the first and second connectors are in a connected configuration, as shown in FIG. 5, it will be understood that, as the contacts 106, 108 are in contact, the contact axes C1,C2, will be substantially coaxial.

In this example, the second connector is attached to a cable 130, the other end of which is connected to the charging apparatus 2. The cable 130 is in communication with the complimentary contacts 108 to provide power and data transfer with the contacts 106 of the first connector 102. The cable 130 connects with the second connector 104 a connection interface 132. At the connection interface 132, the cable is secured to the connector by a cable restraint 134. A longitudinal axis L of the cable 130 is substantially perpendicular to the contact axis C2 of the second connector and, while the connectors 102,104 are connected, also perpendicular to the contact axis C1 of the first connector.

The protrusion 114 of the first connector 102 comprises a peripheral surface 136 which is inclined with respect to the cable axis L when the connectors are connected. The inclined peripheral surface 136 is arranged on an opposing side of the protrusion 114 to the cable 130 in the connected configuration. The incline of the surface 136 is such that the protrusion 114 tapers with increasing distance from the surface 110. The recess 124 comprises a complimentary peripheral surface 138 which is configured to overlay the peripheral surface 136 of the protrusion 114 in the connected configuration as shown in FIG. 5. The surface 138 is similarly inclined with respect to the longitudinal axis L of the cable 130, and is likewise arranged on an opposing side of the recess 124 to the cable 130 (and its connection interface 132 with the connector 104).

The incline of the surfaces 136,138 is such that, in the connected configuration, a tensile force applied to the cable (shown by arrow F on FIG. 5) will be translated due to contact between the surfaces 136,138 into an inclined movement of the second connector 104 away from the first connector 102, as indicated my arrow M on FIG. 5. This movement of the connectors 102,104 away from one another increases the distance between the magnetically attractive elements 120 and the magnets 128, thereby reducing the magnetic retaining force and enabling the connectors 102, 104 to be disconnected with a mere tensile force on the cable 130.

The contacts 106,108 being arranged along axes generally perpendicular to the cable 130 means that, on application of a tensile force to the cable, the contacts pairs 106*a,b,c* and 108*a,b,c* may be more likely to be disconnected substantially simultaneously, which may reduce the risk of short circuits and other electrical issues if the pairs of contacts are disconnected at slightly different times.

Figure 6:
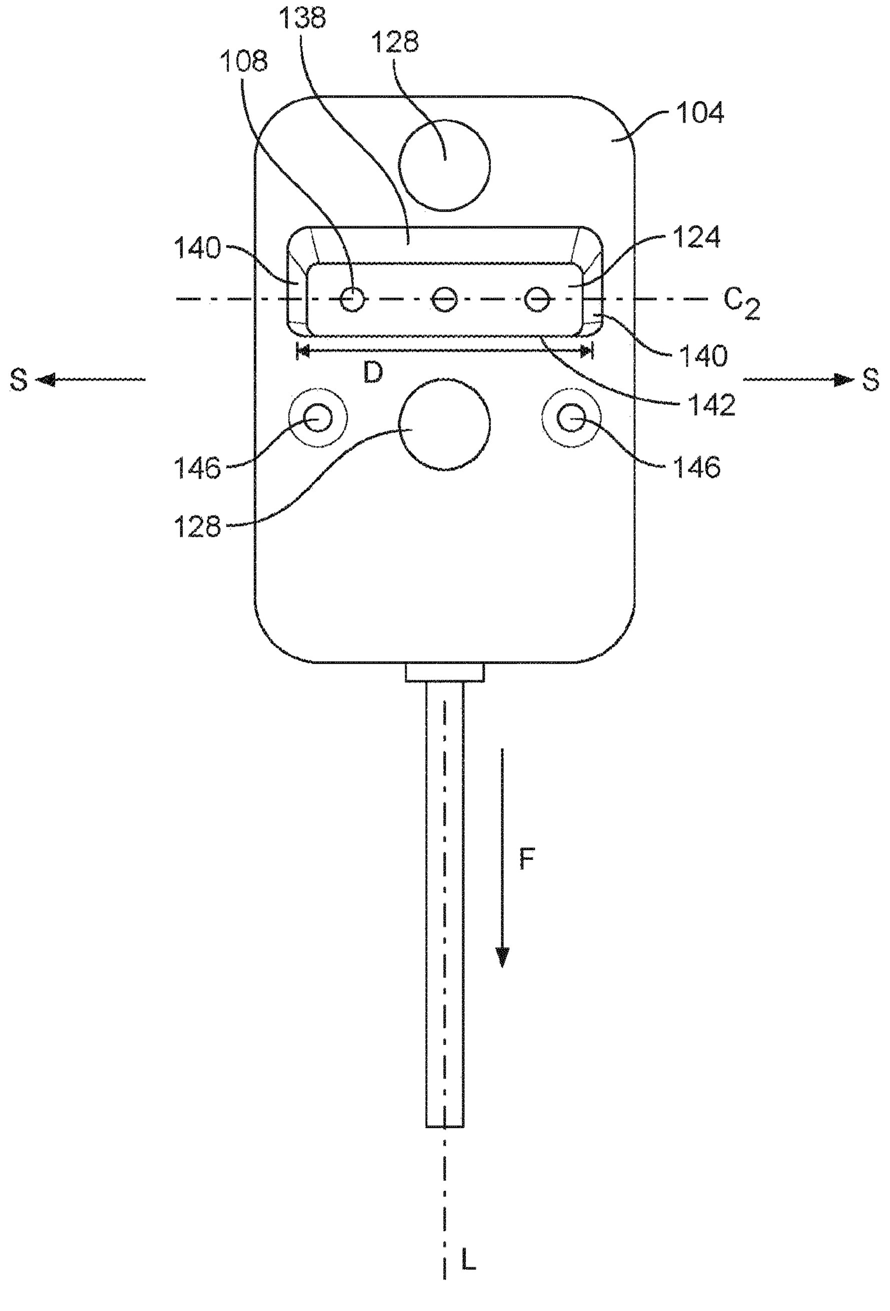
FIG. 6 is a plan view of a breathing apparatus connector having a cable.

Turning to FIG. 6, the second connector 104 is shown in plan view. As can be observed, the recess 124 has a longest dimension D which extends substantially perpendicular to the longitudinal axis L of the cable 130, i.e. generally parallel to contact axis C2.

The protrusion 114 and the complementary recess 124 in this example further comprise two additional peripheral inclined surfaces 140, which are arranged on the short ends of the protrusion and recess, and which generally extend parallel to the longitudinal axis L of the cable 130. These inclined surfaces are configured such that, in the connected configuration, a lateral force (see arrows S in FIG. 6) applied to the connector (i.e. a force which is not aligned with the longitudinal axis L of the cable 130) will urge the first and second connectors 102,104 to disconnect as the further inclined peripheral surfaces 140 move relative to one another.

The fourth and final peripheral wall 142 of the protrusion 114 and recess 124 is a substantially perpendicular to the surface 110 and the surface 122, i.e. the surfaces 142 are not inclined. Therefore, the protrusion and recess have only one degree of rotational symmetry (as can be observed in FIG. 6) such that the connectors 102,104 can only be connected in one orientation. This may ensure that the contacts 106,108 are always connected in the correct pairs.

Figure 7:
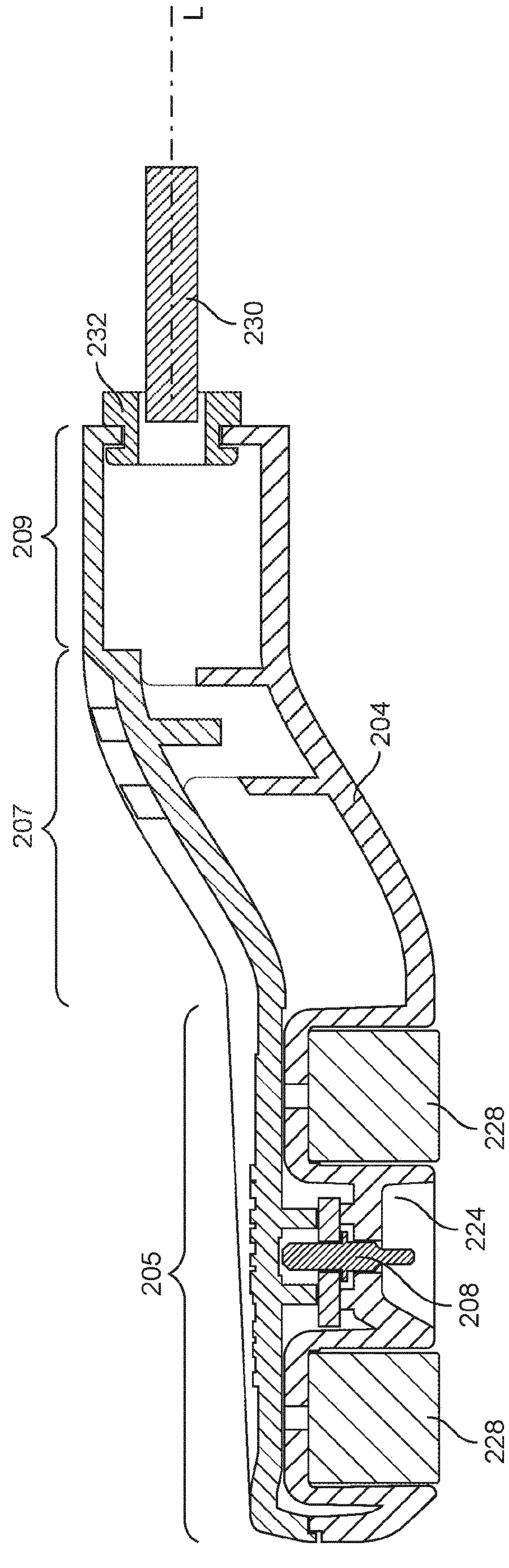
FIG. 7 is a cross-sectional view of an alternative connector having a cable.

Turning now to FIG. 7, an alternative example of the second connector 204 is shown. In this example, the connector 204 comprises a connector portion 205 on which the complimentary recess 224 is arranged, in a manner similar to that described for the connector 104 above. The connector portion 205 is substantially flat or planar, taking the form of a flat cuboid. In this example, the connector 204 further comprises a stepped portion 207, and a cable portion 209 providing the connection interface 232 between the cable 230 and the connector 204. The stepped portion 207 is inclined with respect to the connector portion 205 such that the cable is spaced apart from the connector portion. Therefore, the cable 230 intersects with the connector 204 at a location which is spaced away from the other connector (for example first connector 102) to a greater degree than the connector portion 205.

This configuration may result in a tensile force applied to the cable 230 additionally applying a resolved inclined force on the connector portion 205, which may further assist in lifting the second connector 204 away from the first connector 102.

Figure 8:
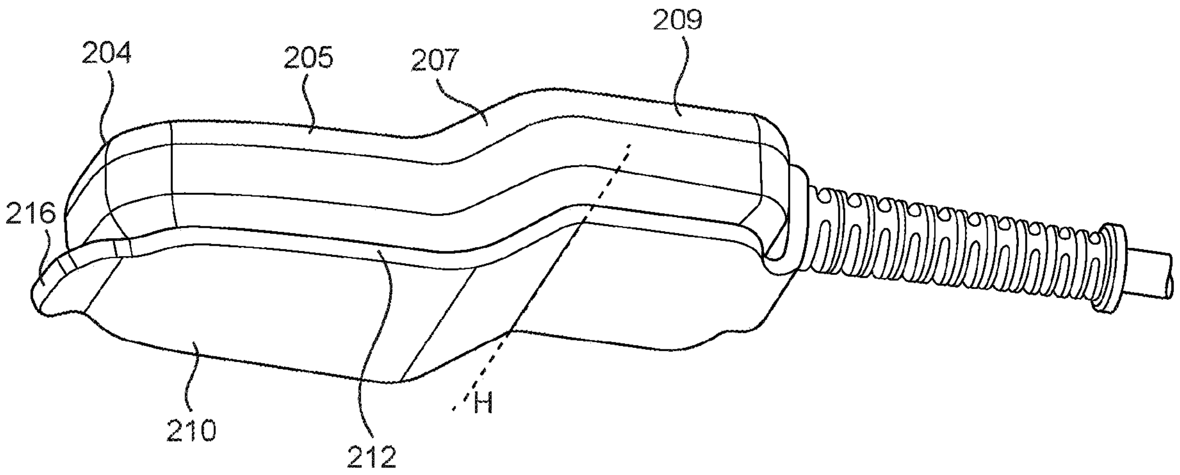
Figure 9:
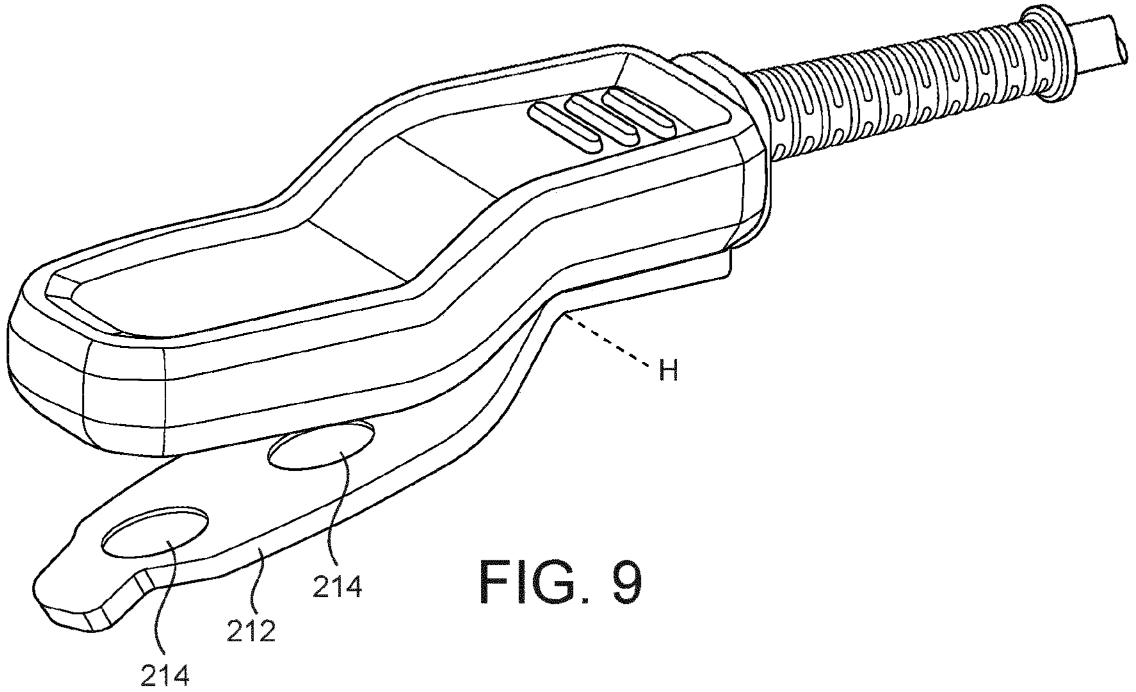

As shown in FIGS. 8 and 9, the second connector 204 comprises a cover 210, configured to overlay the connecting surface of each of the connector portion 205, stepped portion 207 and cable portion 209. The cover 210 comprises an elastomeric material layer 212, and two magnetic elements 214 attached to the elastomeric layer 212 (shown in FIG. 9). The magnetic elements 214 are made from a ferrous metal, such as steel. The magnetic elements 214 are configured to overlay and be attracted to the magnets 228 so as to keep the cover 210 in position when the second connector 204 is not in use (as shown in FIG. 8).

The cover 210 is hingedly attached to the second connector 204 at the cable portion 209, so as to pivot about hinge line H. The cover 210 further comprises a pull tab 216. By lifting the pull tab 216, the magnets 228 of the connector portion 205 can be exposed (as shown in FIG. 9), i.e. when it is desired to attach the second connector 204 to a first connector 102.

The cover 210 prevents inadvertent attachment between the magnets 228 of the second connector 104 and ferrous metal articles, when the second connector 204 is not in use. It will be understood that a corresponding cover 210 may be used with the second connector 104 described above.

A further aspect of the connector system 100 will now be described.

It has been described above that the first connector comprises a protrusion 114 and the second connector comprises a complimentarily shaped recess 124 for receiving the protrusion, which are rotationally un-symmetric to limit the connection of the connectors 102,104 in a single orientation. In order to further prevent connection of the connectors 102,104 in an incorrect orientation, the first connector 102 comprises further protrusions 144, and the second connector 104 comprises further complimentary recesses 146 for receiving the protrusions 144 in the connected configuration. By providing multiple protrusions 114, 144 and multiple complimentary recesses 124,146, an incorrect connection of the connectors can be avoided because, in an incorrect orientation, the protrusions 144 will contact the surface 122 of the second connector 104 and prevent the connectors from engaging correctly such that the magnets 128 can secure the connection. It should be understood that, generally, the geometry of the protrusions and the complimentary recesses is such that the contacts 106 and 108 will not touch unless the connectors are connected in the correct orientation.

In this example, the further protrusions 144 and complimentary recesses 146 are substantially frustoconical in shape such that a lateral force in any direction in the plane of the connectors (i.e. a direction transverse to the direction of extension of the protrusions) will result in a lifting force which will urge the connectors apart. It should be understood that the protrusion and recess which comprise contacts are 'contact projection' and 'contact recess' and the other protrusions and recesses may be locating protrusions and recesses which do not comprise contacts.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

For example, the above detailed description describes a particular configuration of the connection system in which the protruding elements are provided on the connector which is located on the backplate, while the recesses are provided on the other connector. In other examples, the recesses may be provided on the backplate connector, while the other connector comprises protrusions. In yet further examples, both of the connectors may feature both recesses and protrusions which are complimentary to respective opposing protrusions and recesses on the other connector.

The invention claimed is:

1. A breathing apparatus comprising a wearable support frame, wherein the wearable support frame comprises a connector system comprising:

a first connector provided on the wearable support frame, the first connector comprising an electrical transfer element and a non-magnetized, magnetically attractive element to be attracted by a magnet;

a second connector for connection to the first connector, comprising a complementary electrical transfer element for power and/or data transfer with the electrical transfer element of the first connector and further comprising a magnet for attracting the magnetically attractive element so as to magnetically secure the first and second connector to one another for power and/or data transfer between the electrical transfer elements; and wherein the magnetically attractive element is covered by a non-conducting material such that the magnetically attractive element is not exposed on a surface of the first connector.

2. The breathing apparatus as claimed in claim 1, wherein the first connector comprises a plurality of magnetically attractive elements and the second connector comprises a respective plurality of magnets for attracting the plurality of magnetically attractive elements.

3. The breathing apparatus as claimed in claim 2, wherein at least two of the magnetically attractive elements are arranged on opposing sides of the electrical transfer element, and wherein at least two of the magnets are arranged on opposing sides of the complementary electrical transfer element.

4. The breathing apparatus as claimed in claim 1, wherein the electrical transfer element and the complementary electrical transfer element are conductive electrical contacts.

5. The breathing apparatus as claimed in claim 1, wherein the electrical transfer element and the complementary electrical transfer element are inductive electrical elements.

6. The breathing apparatus as claimed in claim 1, wherein the magnet is a permanent magnet or an electromagnet.

7. The breathing apparatus as claimed in claim 1, wherein the first connector comprises a protrusion or a recess having the electrical transfer element, and the second connector comprises a complementary recess or protrusion having the complementary electrical transfer element.

8. The breathing apparatus as claimed in claim 1, comprising a plurality of electrical transfer elements and a respective plurality of complimentary electrical transfer elements, wherein at least one pair of an electrical transfer element and a complimentary electrical transfer element are configured to transfer power, and at least one pair of an electrical transfer element and a complimentary electrical transfer element are configured to transfer data.

9. The breathing apparatus as claimed in claim 1, further comprising a charging apparatus comprising the second connector, the charging apparatus configured to charge the breathing apparatus via the first and second connectors.

10. A breathing apparatus comprising a wearable support frame, wherein the wearable support frame comprises a connector system for power and/or data transfer, comprising:

a first connector comprising a contact protrusion having at least first and second electrical contacts, the electrical contacts defining a contact axis along a straight line extending between the first and second contacts, and the first connector comprising a non-magnetized, magnetically attractive element to be attracted by a magnet;

a second connector comprising a complementary recess for receiving the contact protrusion having complementary electrical contacts for contacting the first and second electrical contacts of the first connector, and the second connector comprising a magnet for attracting the magnetically attractive element so as to magnetically secure the first and second connector to one another;

wherein at least one of the first and second connectors is attached to a cable and, at a connection interface between the cable and the connector, a longitudinal axis of the cable is substantially perpendicular to the contact axis;

wherein the contact protrusion and the complementary recess each comprise a peripheral surface which is inclined with respect to the longitudinal axis of the cable, wherein the inclined peripheral surfaces are configured to overlay one another when the first and second connectors are in a connected configuration; and wherein the inclined peripheral surfaces are inclined with respect to the longitudinal axis of the cable such that, in the connected configuration, a tensile force applied to the cable will urge the first and second connectors to disconnect as the inclined peripheral surfaces move relative to one another.

11. The breathing apparatus as claimed in claim 10, wherein the contact protrusion and/or the complimentary recess have a longest dimension which extends substantially perpendicular to the longitudinal axis of the cable.

12. The breathing apparatus as claimed in claim 10, wherein the inclined peripheral surfaces are arranged on an opposing peripheral side of the contact protrusion and/or complimentary recess to the connection interface between the cable and the connector.

13. The breathing apparatus as claimed in claim 10, wherein the first and/or second connector comprises a connector portion on which the contact protrusion or complimentary recess is arranged, the connector portion being substantially planar, and wherein the respective connector further comprises a stepped portion comprising the connection interface between the cable and the connector such that the longitudinal axis of the cable is spaced apart from the connector portion.

14. The breathing apparatus as claimed in claim 10, wherein the first and second connectors each comprise three or more electrical contacts arranged on the contact axis.

15. The breathing apparatus as claimed in claim 10, wherein the contact protrusion and the complementary recess each further comprise a further peripheral inclined surface which is parallel to the longitudinal axis of the cable, such that, in the connected configuration, a lateral force applied to the first or second connector which is non-parallel to the longitudinal axis of the cable will urge the first and second connectors to disconnect as the further inclined peripheral surfaces move relative to one another.

16. The breathing apparatus as claimed in claim 10, wherein at least one pair of an electrical contact and a complimentary electrical contact are configured to transfer power, and at least one pair of an electrical contact and a complimentary electrical contact are configured to transfer data.

17. The breathing apparatus of claim 10 further comprising a charging apparatus comprising the second connector, the charging apparatus configured to charge the breathing apparatus via the first and second connectors.

* * * * *